(12) United States Patent
Constans et al.

(10) Patent No.: US 8,948,937 B2
(45) Date of Patent: Feb. 3, 2015

(54) METHOD AND DEVICE FOR AN OPTIMAL MANAGEMENT OF THE ENERGY OF AN AIRCRAFT

(75) Inventors: Florian Constans, Pibrac (FR); Mickael Lefebvre, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 372 days.

(21) Appl. No.: 13/559,325

(22) Filed: Jul. 26, 2012

(65) Prior Publication Data

US 2013/0030612 A1 Jan. 31, 2013

(30) Foreign Application Priority Data

Jul. 29, 2011 (FR) .................................. 11 56958

(51) Int. Cl.
*G06F 7/70* (2006.01)
*G05D 1/10* (2006.01)
*G08G 5/00* (2006.01)
*G05D 1/00* (2006.01)
*G01C 23/00* (2006.01)

(52) U.S. Cl.
CPC .............. *G05D 1/101* (2013.01); *G08G 5/0013* (2013.01); *G05D 1/0077* (2013.01); *G01C 23/00* (2013.01); *G01C 23/005* (2013.01); *G08G 5/0021* (2013.01)
USPC ...................... 701/14; 701/8; 701/15; 701/16

(58) Field of Classification Search
CPC .... G01C 23/00; G01C 23/005; G08C 5/0021; G05D 1/0077; G08G 5/0013

USPC .......... 700/291, 286, 295; 701/14, 3, 99, 123, 701/16, 70; 428/174; 156/60; 702/100; 359/266; 290/46; 318/376; 244/58; 165/104.11; 307/9.1; 137/561 R; 340/973, 974
See application file for complete search history.

(56) References Cited

U.S. PATENT DOCUMENTS

| 4,809,174 | A * | 2/1989 | Momenthy .................... 701/3 |
| 8,447,441 | B2 * | 5/2013 | Calvignac et al. ............. 701/3 |
| 8,527,173 | B2 * | 9/2013 | Lacoste et al. ................ 701/70 |
| 8,694,180 | B2 * | 4/2014 | Glassl et al. ................... 701/3 |
| 8,706,324 | B2 * | 4/2014 | Barral et al. ................. 701/14 |
| 2008/0140272 | A1 | 6/2008 | Zadrozynski |
| 2011/0178648 | A1 * | 7/2011 | Calvignac et al. ............ 700/291 |

FOREIGN PATENT DOCUMENTS

| EP | 2 282 247 | 2/2011 |
| FR | 2 908 220 | 5/2008 |

OTHER PUBLICATIONS

French Search Report dated Feb. 28, 2012.

* cited by examiner

*Primary Examiner* — Behrang Badii
(74) *Attorney, Agent, or Firm* — Dickinson Wright PLLC (57) ABSTRACT

Method and device for an optimal management of the energy of an aircraft.
The device (1) includes means (5) for determining, in an iterative manner, according to a predicted energy state and according to a management strategy, optimal commands of means (S1, S2, S3, S4, S5, S6) for controlling the energy of the aircraft, which allow the aircraft to reach a given point of a trajectory in a given operational state.

14 Claims, 2 Drawing Sheets

METHOD AND DEVICE FOR AN OPTIMAL MANAGEMENT OF THE ENERGY OF AN AIRCRAFT

The present invention relates to a method and a device for an optimized energy management of an aircraft, in particular an airplane and specifically a transport airplane, upon a flight of the latter along a trajectory, so as to join a given point of said trajectory in a given operational state.

Although not exclusively, the present invention applies more particularly to an approach phase in view of a landing on a runway in an airport or on any other known way with the purpose to reach a predetermined point before a final landing in a given operational state.

The present invention thus relates to an airplane guiding toward an objective (given point) located in the space, as well as different energy management means being controlled so as to reach the given operational state.

In the scope of the present invention, the operational state is characterized by a set of constraints on the airplane parameters as defined hereinafter:
 a given point of the air space in which the airplane flies. The meeting point is usually defined by three coordinates (longitude, latitude, altitude). As an example, but not exclusively, the given point in the air space can be determined relative to a runway in an airport;
 a setpoint speed of the aircraft being stabilized at the given point of the space. As an example, but not exclusively, the speed can be determined by the reference speed used in an approach phase before landing;
 a stabilized setpoint state for the different energy controlling means of the airplane. It can be mentioned as an example, but not exclusively:
  an established thrust of the engines; and
  an aerodynamic configuration of the aircraft. Such configuration is defined, amongst others, but not exclusively, by the position of the slats and flaps, as well as by the position of the landing gear.

In the scope of the present invention, the notion of energy is usually defined as the total mechanical energy of the airplane determined by the sum of a potential energy directly proportional to the altitude of the airplane et a kinetic energy proportional to the square speed of the airplane.

More precisely, the object of the invention is to automatically manage a set of energy controlling means with as an objective to provide an energy meeting of the airplane at a given point, while meeting particular constraints defined by the operational state.

It is known that the pilot has available different correction or controlling means to satisfy the meeting.

In order to satisfy the meeting at a given point of the space by following a trajectory, there can be conventional means to guide the airplane according to said given trajectory, such as control surfaces (ailerons, rudder, fin).

To satisfy the energy meeting at the given point of the space, said energy meeting being defined by the combination of said altitude and speed parameters, there can be different means:
 so-called conventional short-term means affecting the energy variation of the airplane, such as engines and airbrakes;
 means allowed by the aerodynamic configuration of the airplane, such as the slats and flaps and the landing gear. The latter impact on the airplane fineness and, consequently, on its capacity to keep more or less the energy thereof at zero thrust; and
 operational means, namely the modification of the vertical flight plan, based more on the notion of energy distribution between kinetic energy and potential energy, the modification of the lateral flight plan, allowing the ground trace to be adjusted and the airplane energy situation thus to be adapted with the setpoint and finally the modification of the setpoint speed servo-controlled by the auto-throttle.

It will be noticed that at each moment, the energy variation of the airplane is given by the difference between the engine thrust and the overall drag of the airplane, such drag coming from the combination of the effects of the airbrakes, the slats and flaps, and the landing gear.

Three different ways are known to guide an airplane from a given point of the space, with a certain initial altitude and a certain initial speed, toward another point of the space with another (final) altitude and another (final) speed, and this, according to each of the axes, namely:
 a manual piloting;
 an automatic piloting in a selected mode; and
 an automatic piloting in a managed mode.

Now, the above-mentioned different usual ways for piloting an airplane will be detailed.

Upon a manual piloting, the pilot controls the airplane on the three axes thereof thru the joystick (piloting along a trajectory desired by the pilot, with an altitude defining the energy distribution between kinetic energy and potential energy) and the different levers to control the motive thrust, the drag devices (airbrakes), the setpoint position of the slats and flaps (all these means affecting the overall energy variation on the airplane). The pilot may follow the evolution of the airplane, as well as other parameters such as speed, vertical speed, attitude, . . . , thanks to different displays located in the cockpit.

The manual piloting strategy being used to guide the airplane toward a point in the space is the one imposed by the pilot. If the pilot has the capacities to guide the airplane toward the objective, nothing guarantees the pilot's optimality. Indeed, the pilot must manage at the best the energy level of the airplane by using the engine lever or the airbrake lever, while providing the energy distribution using the joystick controlling the airplane on the three axes.

In the case of an approach, the pilot must also control the extension of the slats and flaps usually thru a lever provided for this purpose. The extension of the slats and flaps having a direct impact on the airplane performance, the pilot must then plan the extension as a function of the flied trajectory and of the targeted speed setpoint.

In the above mentioned preferential case, if the fineness of the airplane is too much downgraded, the pilot will manually increase the thrust level so as to keep the trajectory and the speed profile. In the contrary case (when the fineness of the airplane is not enough downgraded), the pilot can manually use the airbrakes. However, the use of the engines and the airbrakes is not necessarily optimized and depends on the know-how of the pilot.

Furthermore, in order to simplify and help the pilot in the short term piloting of the airplane, he has a so-called "selected" mode available, which activates a so-called "autopilot" function adapted to pilot the airplane trajectory on an automatic way and/or which activates a so-called "self-thrust" function being able to pilot the airplane speed or a motive thrust level on an automatic way. The autopilot servo-controls the trajectory and the airplane speed of different piloting modes dedicated to the autopilot allowing amongst others slope maintenances, altitude changes, vertical speed maintenances, speed maintenances on a trajectory, . . .

The command of the slats and flaps, of the landing gear and of the airbrakes serving more particularly upon the approach phase, stays manual and is under the pilot's responsibility.

Despite the partially automatic character of such mode, the strategy to be applied so as to provide a meeting in the space is still imposed by the pilot, including thru setpoints sent to the autopilot. The guiding strategy (relative to the automatic piloting in a selected mode) still depends on the pilot and is not necessarily optimal.

Furthermore, the pilot also has a so-called "managed" mode available. Such mode can also activate the "autopilot" and/or the self-thrust so as to pilot the trajectory and the speed on an automatic way, with this difference that the piloting setpoints are calculated by the flight management system from the flight plane defined by the pilot. Such trajectory is defined by a flight management system of the FMS ("Flight Management System") type using amongst others performance models for the airplane.

It is possible in some cases that the trajectory to be flied needs the use of the airbrakes. In such cases, only the pilot has the authority to extend the airbrakes (manually).

In the approach cases, the command of the slats and flaps and of the landing gear still stays manual and under the pilot's responsibility.

With this auto-piloting in a managed mode, a more optimized approach of the flight management is obtained thanks to the FMS system that calculates flyable trajectories ensuring the airplane meeting.

It will be noticed that despite an increased automation level, some means are only usable manually, namely the airbrakes, the slats, the flaps and the landing gear.

On the present airplanes, the command of the slap and flap configurations is manually implemented thru a specific lever positioned in the cockpit. The slat and flap configuration changes are decided by comparison between the airplane speed and characteristic speeds expressed in calibrated speed CAS. Such operational speeds are the following:

a minimum operational speed in a smooth configuration (so-called "green dot speed"). Switching into configuration 1 generally occurs at such speed.

This speed specifically offers the best fineness in a smooth configuration. It depends on the altitude and the mass of the airplane;

a recommended speed (so-called "S-speed") to control the configuration 2. This speed depends on the minimum control speed VMCL (minimum monitoring speed), on the speed VS1g (minimum speed to maintain a uniform rectilinear flight) in a configuration 1 and on the speed VFE (maximum speed under which the configuration can be activated) in a configuration 2;

a recommended speed (so-called "F2-speed") so as to control the configuration 3. Such a speed depends on the minimum monitoring speed VMCL, on the speed VS1g in a configuration 2 and on the speed VFE in a configuration 3; and a recommended speed (so-called "F3-speed") to control the so-called "full" configuration. Such speed depends on the monitoring minimum speed VMCL, on the speed VS1g in a configuration 3 and on the speed VFE in a so-called "full" configuration.

Operationally, the extension of the landing gear is controlled as soon as the configuration 2 is extended. Nevertheless, generally speaking, the landing gear can be used under the maximum extension speed of the landing gear.

Thus, in order to inform the pilot about the current energy state of the airplane and to help him in the energy management in approach, it is known from the document US-2008/0140272 a solution allowing the over-energy situations to be anticipated. The object of such a solution is to display two energy prediction circles on an interface ND ("Navigation Display") of the cockpit so as to inform the pilot about its energy state predicted at the level of the runway threshold. Both calculated predictions consider the hypothesis of a standard descent (standard trajectory with a standard deceleration step, extension of the aerodynamic configurations and of the landing gear according to the standard procedure) and a limit descent (anticipated extension of the aerodynamic configurations, anticipated train extension, maximum extended airbrakes). Thanks to the representation of such circles, the pilot can anticipate the under- or over-energy state by using respectively the engines or the airbrakes and can thus bring back the airplane toward an acceptable energy state. Such solution presents the interest to inform the pilot about its energy state, however the correction to be applied stays at the pilot's charge. Moreover, the energy circles are based on two trajectory types (extreme trajectories) and do not provide any precise indication for other types of intermediate trajectory.

Consequently various problems are to be solved:

to inform the pilot about its energy state throughout its trajectory up to a final objective. The solution as proposed by the document US-2008/0140272 is of a great utility upon the descent phase until the deceleration point, but it only presupposes two package ways of piloting the airplane and does not provide itself the implementation of the airplane piloting;

to help the pilot in his decision taking. Upon non nominal situations (case of wind, over-energy, under-energy), the pilot must use his know-how to adapt the airplane piloting to the changing external surroundings and with respect to the current fineness of the airplane. The pilot must call on his own experience to estimate the effect of the use of the different means on the coming energy state. Such estimate stays however imprecise and not optimal; and to reduce the working charge of the pilot. In fact, despite various automation levels, several means stay manually controlled.

The present invention aims at remedying such drawbacks. It relates to an optimized energy management method for an aircraft, particularly an airplane, upon a flight along a trajectory so as to join a given point of said trajectory in a given operational state, especially upon an approach phase for a landing.

With this end in view, according to the invention, said method is remarkable in that, upon the flight of the airplane along said trajectory until said given point, automatically and repetitively, the sequence of successive steps is implemented as follow:

a) the current values of parameters of the airplane are determined;

b) the predicted energy state of the airplane at said point is calculated as a function of these current values and predetermined models and iteratively as a function of the predicted energy state, optimized command orders for means for controlling the airplane energy are determined, said optimized command orders being instantaneous (to be immediately applied by the adequate means) or future (application of the order by the right means at a subsequent moment) such that they allow the airplane to reach said given point in said given physical operational state; and c) the instantaneous optimized command orders being thus determined are applied to said energy control means.

Moreover, advantageously, the information is sent back to the crew concerning the instantaneous and future orders provided by the invention.

So, thanks to the invention, thru the above mentioned iterative processing by taking a predicted energy state of the airplane into account at the point to be joined, it is automatically possible to determine optimized command orders allowing the airplane to reach said point while presenting said given operational state.

Moreover, since such processing, as detailed below, is iterative, throughout the flight, the commands of the slats and flaps, as well of the landing gear are adapted for the current situation of the airplane.

According to the invention, the command orders are optimized according to a management strategy. Advantageously, the management strategy used at step b) corresponds to a manually or automatically selected strategy, namely either manually selected by a pilot of the airplane or automatically determined by the flight management system by taking into account the high level setpoints formulated by the airline company. In the absence of selection, a default strategy will be able to be used.

In a preferred embodiment, at step b), at least one of the following management strategies can be used:
 a noise reduction strategy;
 a fuel consumption reduction strategy;
 a comfort management strategy for the passengers;
 a maximum efficiency strategy;
 a destination distance management strategy; and
 at least one mixed strategy combining at least two of the preceding strategies. Furthermore, according to the invention, a plurality of different modes is provided, each of which comprises associated particular means for controlling the airplane energy. Advantageously, at least some of the following modes are taken into account:
 a control mode for the slats and flaps (defining the aerodynamic configuration of the airplane) and for the landing gear;
 a control mode for the airbrakes;
 a control mode for the engines;
 a control mode for means modifying the planned vertical trajectory of the airplane;
 a control mode for means modifying the planned lateral trajectory of the airplane; and
 a control mode for means modifying the setpoint speed servo-controlled by the self-thrust.

Advantageously, as a function of the management strategy used at step b), it is possible, in a preferential application of the invention, to determine a priority order of said modes allowing an automatic selection of the mode to be used upon the implementation of the invention. It is also possible, in a secondary application, beside the priority order of said modes, to simultaneously apply several modes.

Moreover, advantageously, for each mode, a prediction module and an optimization module are provided for command orders to be applied to energy monitoring means associated with said mode and said modules are implemented at step b) to determine said optimized command orders.

Furthermore, advantageously:
 the above mentioned models comprise at least some of the following elements: a wind model, performance models for the airplane, an indication of the dynamics of the actuators associated with energy monitoring means and an indication of operational constraints; and
 at step c), information relative to the control of the energy monitoring means, as detailed hereinunder, are presented to a pilot.

Moreover, advantageously, in case of a failure in the energy control means, a reconfiguration is performed in unfailing energy control means, as detailed hereinunder.

The present invention presents consequently numerous advantages. Between other things, it allows:
 the cohesive control of some energy control means (all or part) to be implemented automatically;
 the pilot to be informed in real time about the energy states of the airplane thru appropriate operational parameters (indication of speed, altitude, etc.), whatever instantaneous and future. The future state is the state predicted at the given point of the meeting operational state;
 the pilot to be informed in real time about the commands applied at the present time or at future times and their effects on the trajectory and the energy balance of the airplane; and
 the piloting charge of the pilot to be globally reduced.

The present invention also relates to an optimized energy management device for an airplane, in particular a transport airplane, upon a flight along a predetermined trajectory so as to join a given point of said trajectory with a given operational state, specifically upon an approach phase in view of a landing on a runway of an airport.

According to the invention, said device is remarkable in that it comprises:
 means for determining automatically the current values of parameters of the airplane upon the airplane flight along said trajectory up to the given point;
 means for calculating automatically the predicted energy state of the airplane at said point, as a function of these current values and predetermined models and for determining automatically on an iterative way depending on the predicted energy state, optimized command orders of energy control means of the airplane, said optimized command orders being such that they allow the airplane the given point to be reached in said given operational state; and
 energy control means of the airplane, to which the optimized command orders being so determined are automatically applied.

In a particular embodiment, said device provided for the flight control and the flight operational management comprises in addition:
 display means to present to a pilot(s) of the airplane, on a viewing screen, information relative to the commands of energy control means, as detailed hereinunder; and/or
 interface means allowing an operator to enter data in said device, especially the selected management strategy.

The present invention also relates to an aircraft, in particular an airplane and especially a transport airplane, which is provided with a device such as the one above mentioned.

FIGS. of the accompanying drawing will make understood how the invention can be implemented. On these FIGS., identical annotations denote similar elements.

Figure 1:
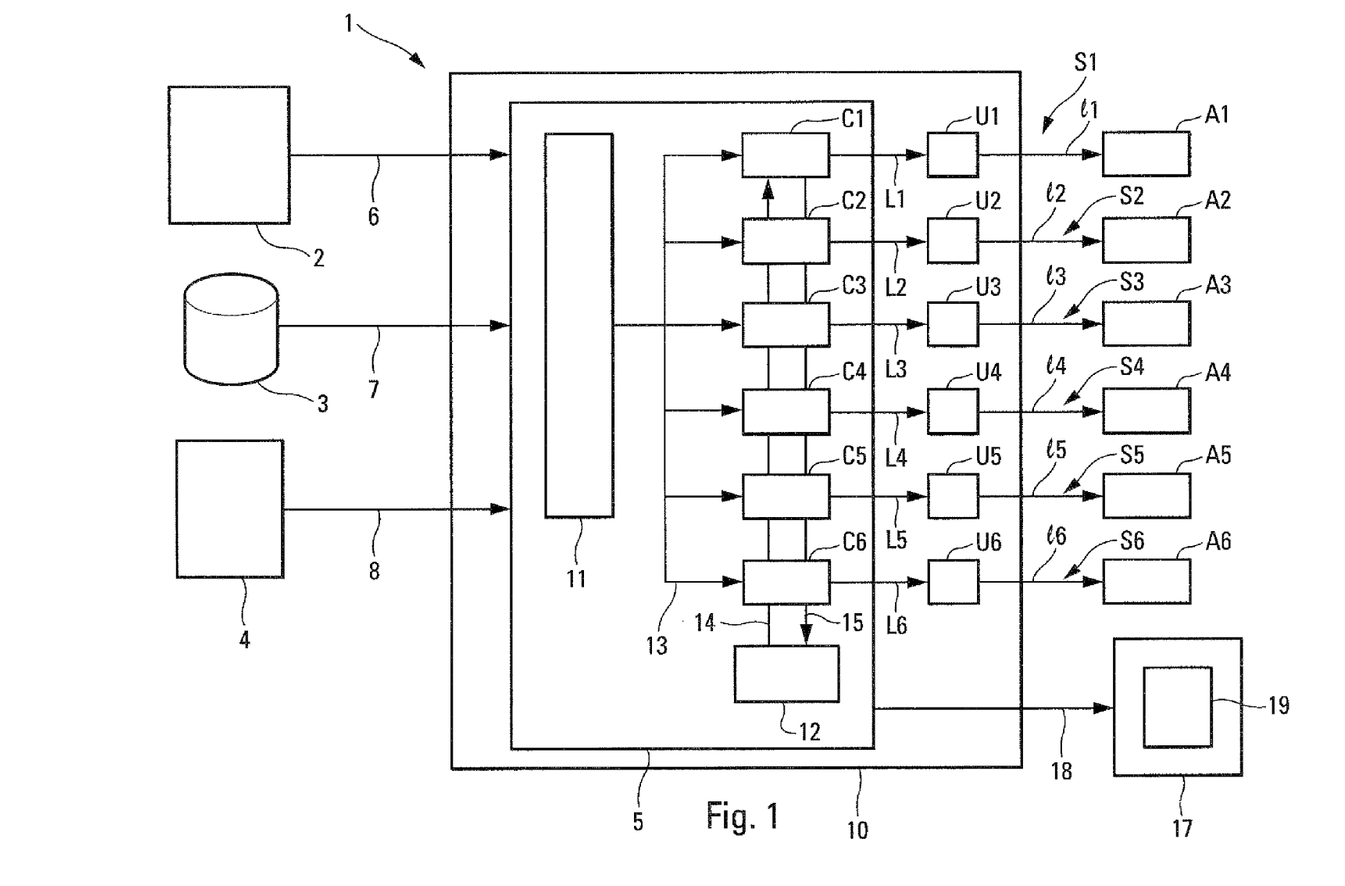
FIG. 1 is the block diagram of a device according to the invention.

The device 1 according to the invention and schematically represented on FIG. 1 is provided to implement an optimized energy management for an airplane (not represented), in particular a transport airplane, upon a flight along a trajectory so as to join a given point Pf of said trajectory in a given operational state, especially upon an approach phase in view of a landing on a runway of an airport or on any other known way.

Figure 2:
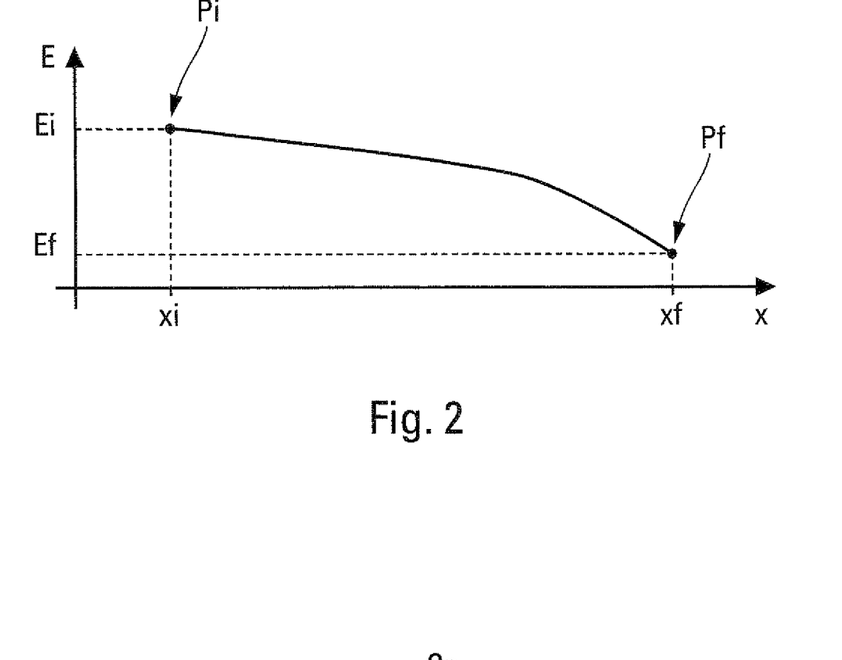
FIG. 2 is a graph showing an example of an energy profile of an airplane between two points, an initial point and a final point.

On FIG. 2, an example of a specific energy profile E for an airplane between a given point Pi of the space (in a position xi) with a certain initial height hi and a certain initial speed Vi (defining a specific energy Ei) toward another point Pf (in a position xf) of the space with another final altitude hf and another final speed Vf (defining a specific energy Ef).

Usually, the specific energies El and Ef are defined by the following expression (by using the correspondent values of height hi, hf and speed Vi, Vf instead of h and V):

$$E=(V^2/2g)+h$$

According the invention, said device 1 comprises:
a set 2 of usual information sources being detailed hereinunder, allowing the current values of the flight parameters of the airplane to be determined;
at least one data base 3 comprising models being detailed hereinunder;
interface means 4, in particular a keyboard associated with a screen or any other usual means allowing a pilot to enter data into the device 1, particularly a management strategy;
an information processing unit 5 which is connected thru links 6 to 8, respectively to said means 2 to 4 and which is formed so as:
  to calculate the predicted energy state of the airplane at the point to be reached as a function especially of these current values and these models; and
  to determine on an iterative way as a function of the predicted energy state, optimized command orders for an energy control of the airplane, said optimized command orders being such that they allow the airplane to reach said given point to be joined in said given operational energy state;
usual systems S1 to S6 for controlling the airplane energy, to which are automatically applied the optimized command orders determined by the information processing unit 5 and adapted to be transmitted via links L1 to L6.

According to the invention, a plurality of different systems S1 to S6 (respectively corresponding to control modes M1 to M6 as detailed hereinafter) is provided, each of which comprises associated particular means for an energy control of the airplane. More precisely, each system S1, S2, S3, S4, S5 and S6 comprises:
a usual processing unit U1, U2, U3, U4, U5 and U6; and
one or more usual actuators A1, A2, A3, A4, A5 and A6, being controlled by the processing unit U1, U2, U3, U4, U5 and U6 via links 11 à 16, so as to actuate associated elements (engines, slats, flaps, landing gear, etc.) intended for the energy control of the airplane.

Preferably, the device 1 takes the following modes into account:
a control mode M1 for the slats and flaps (defining the aerodynamic configuration of the airplane) as well as the landing gear, enabling the optimization of such elements with as an objective to modulate the energy profile and to satisfy preferably a stabilized approach;
a control mode M2 for the airbrakes having as an objective to increase the capacities of the airplane to reduce energy;
a control mode M3 for the engine thrust having as an objective to help the airplane to converge toward a target energy level;
a control mode M4 for means modifying the vertical trajectory of the airplane, having as an objective to modulate an energy profile and to satisfy preferably a stabilized approach; and
a control mode M5 for means modifying the lateral trajectory of the airplane, having also as an objective to modulate the energy profile and to satisfy preferably a stabilized approach; and
a control mode M6 for means modifying the setpoint speed servo-controlled by the self-thrust, having also as an objective to modulate the energy variation rate. The mode M6 takes profit of the fact that the speed flied by the airplane affects the fineness of said airplane and thus globally its energy variation.

The operation of the modes M1 to M6 is further detailed hereinafter.

In the particular embodiment represented on FIG. 1, the unit 5 and the units U1 to U6 are part of a same calculator 10 on the airplane, in particular a usual calculator.

The unit 5 comprises:
a mode management module 11;
a prediction module 12; and
correction modules C1 to C6 of the iterative type, being associated respectively with said modes M1 to M6 and connected by a link 13 to said mode management module 11 and by links 14 and 15 to said prediction module 12.

Said device 1 also comprises display means 17 that are connected thru a link 18 to the unit 5 and are formed so as to present to a pilot of the airplane, on a viewing screen 19 of the cockpit, information relative to the implementation of the invention, and particularly:
information relative to the command of the energy control systems S1 to S6, such as for example the extension moment for the landing gear or the airbrakes or the modification moment for the aerodynamic configuration or the engines or the vertical and lateral trajectories being planned; and
the flight management strategy being used or any other information being useful for the pilot.

In the scope of the present invention, said set 2 of information sources can comprise, for example:
an air data calculator of the ADC ("Air Data Computer") type;
at least one inertial reference system of the IRS ("Inertial Reference System") type; and
a flight management system of the FMS ("Flight Management System") type.

In one particular embodiment, said set 2 of information sources provides to the unit 5 at least some of the following current values (the following list of which comprises between brackets the name of the corresponding information source):
approach speed (FMS);
landing configuration (FMS);
wind model (FMS);
flight plan (FMS-"Navigation Data Base", namely a navigation data base);
deceleration altitude (FMS-Navigation Data Base);
altitude of the field (FMS-Navigation Data Base);
position of the landing gear (FG "Flight Guidance", namely a flight guiding calculator);
configuration of the slats and flaps (FS);
latitude and longitude of the airplane (IRS);
altitude of the airplane (ADC);
true air speed or TAS ["True Airspeed"] (ADC);
corrected speed or CAS ["Calibrated Airspeed"] (ADC);

characteristic speed (FMS-"Performance Data Base" for base of performance data); and information on possible failing energy control means, for example, but not exclusively: information about the failing engine(s) (all or part), information on a partial or complete failure on the slat and flap system, information of the failure of one or more drag system (airbrakes).

Furthermore, the data base 3 can comprise at least some of the following usual elements being used by the unit 5: a wind model, performance models of the airplane, an indication of the dynamics of the actuators (associated with energy control systems S1 to S6), and an indication of operational constraints.

Consequently, thru the above mentioned iterative processing (taking into account a predicted energy state of the airplane at the point to be joined), the device 1 according to the invention is in a position to automatically determine optimized command orders allowing the airplane to reach said point while being in said given operational state, i.e. while respecting all the constraints being imposed (as regards the energy state, the aerodynamic configuration, the position of the landing gear, etc.).

Moreover, as such processing is iterative, the device 1 adapts throughout the flight the commands of the energy control system(s) S1 to S6 being used, to the current situation of the airplane.

Said device 1 is thus able, first of all, to inform about the energy state of the airplane in real time throughout its planned approach trajectory. And further to such prediction, it is able to control a set of energy control systems S1 to S6 according to a management strategy (so-called a "high level") with as an objective to provide an energy meeting for the airplane.

Although not exclusively, the present invention applies more particularly to an approach phase in view of a landing on a runway of an airport or on any other known way, so as to reach a predetermined point before the final landing. In such preferential case, the objective is to keep a certain trajectory, and then to stabilize the airplane in approach and this, at a certain point in the space before the runway threshold.

According to the invention, the command orders are thus optimized according to a management strategy corresponding to a strategy selected by a pilot (thru the means 4), or to a strategy determined by the flight management system taking the high level setpoints formulated by the airline company into account. In the absence of selection, a default strategy could be used.

In a preferred embodiment, at least some of the following management strategies could be used:
- a noise reduction strategy;
- a fuel consumption reduction strategy;
- a comfort management strategy for the passengers;
- a maximum efficiency strategy;
- a destination distance management strategy; and
- at least one mixed strategy combining at least two of the preceding strategies.

The mode management module 11 being a system based on an intelligent switch selects the mode(s) to be activated as a function of the strategy being imposed. Indeed, said module 11 determines, for each management strategy, a priority order for the modes to be envisaged, thereby enabling an automatic mode selection to be used upon the implementation of the invention. Thus, as an example:

for a noise reduction strategy, it is tried not to bias the actuators making noise, namely the engines and the airbrakes. So, in the case where a similar strategy is selected, the mode management module 11 may give the modes M2 and M3 less priority. Thus, the mode priority order will be: M6, M1, M4, M5, M2 and M3;

for a fuel consumption reduction strategy, it is tried not to bias the actuators consuming fuel. Thus, in the case where a similar strategy is selected, the mode management module 11 may give the mode M3 less priority. Thus, the mode priority order will be: M6, M1, M2, M4, M5 and M3;

for a comfort management strategy for the passengers, it is tried to avoid the comfort in cabin being downgraded. Thus, in the case where a similar strategy is selected, the mode management module 11 may give the mode M2 less priority, since the airbrakes create vibrations when they are extended. So, the mode priority order will be: M6, M1, M3, M4, M5 and M2;

for a maximum efficiency strategy, it is tried to give the priority to the actuators presenting the best efficiencies so as to control the energy within a short term time horizon. Thus, in the case where a similar strategy is selected, the mode management module 11 may give priority calling on the engines and the airbrakes, namely the modes M2 and M3. So, the mode priority order will be: M2, M3, M1, M6, M4 and M5. As an example, such strategy can be used in the case of an emergency descent. The mode management module 11 gives then priority to the use of the airbrakes, then to the optimization of the descent aerodynamic configuration and of the descent setpoint speed;

for a destination distance management strategy, it is tried to adapt the energy loss of the airplane depending of the objective. As an example, but not exclusively, such strategy is used in the case of a complete failure of the engines. The set 2 of information sources sends to the device 1 the information concerning the ideal diversion airport, so defining as an objective an operational state the meeting point of which is located on the runway of the diversion airport. The mode management module 11 will then give priority first of all to the modes M6, M4 and M5 (advantageous adaptation of the descent setpoint speed, of the vertical and lateral trajectories), before calling on the modes M1 and M2 at the end of the descent. The mode M3 is in this case prohibited; and for a mixed strategy, it is to be envisaged to combine some of the preceding modes.

As an example, in the case of an over-energy being detected, it is possible to extend the airbrakes and to slightly modify the vertical profile. Such solution (mixed strategy) can be extended to other combinations, such as, for examples:
- airbrakes and vertical trajectory;
- engines and vertical trajectory;
- slats, flaps, landing gear and airbrakes;
- slats, flaps, landing gear and engines;
- setpoint speed and airbrakes;
- slats, flaps, landing gear and vertical trajectory, etc.

Furthermore, in the case of a failure of an energy control system S1, S2, S3, S4, S5, S6, the device 1 can perform a reconfiguration on non unfailing energy control systems.

So, as an illustration:

upon a failure of the control system S1 for the slats and flaps, the device 1 can use the airbrakes and the trajectory modification in case of an over-energy. Moreover, it can use the engines and the trajectory modification in case of an under-energy; and upon a failure of the control system 92 for the airbrakes, the device 1 can use the control of the slats, the flaps and the landing gear, as well as the trajectory modification, in case of an over-energy;

upon a failure of the engines, the device 1 can use the control of the slats, the flaps and the landing gear, as well the trajectory modification, in case of an under-energy.

Figure 3:
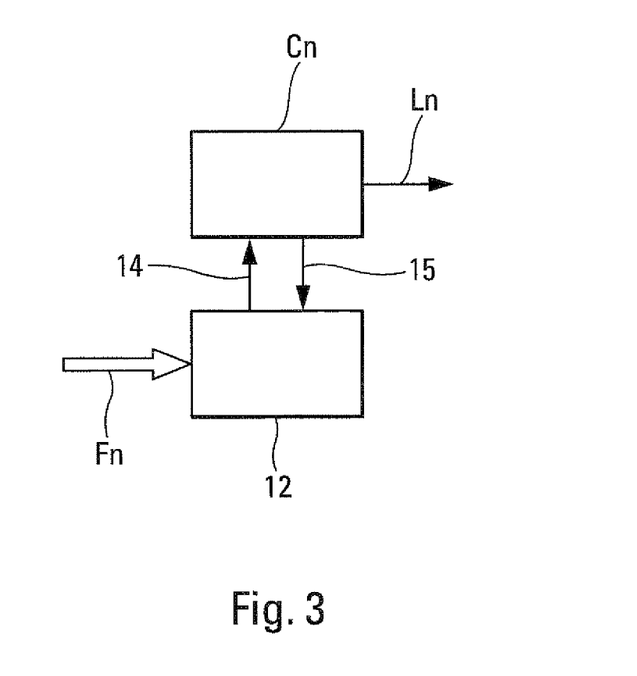
FIG. 3 schematically shows processing means being associated with a particular mode and comprising a prediction module and a correction (or optimization) module.

The device 1 comprises for each mode Mn (n being an integral number from 1 to 5), as generally represented on FIG. 3, a prediction module 12 and an optimization (or correction) module Cn in cooperation, the optimization module Cn transmitting the optimized command orders via a link L1. To do so, the prediction module 12 (or the optimization module Cn) receives via a link Fn a set of information (necessary for the corresponding processings) and including the current values of the parameters (generated by the means 2). One prediction module can be provided for each mode M1 to Mn, or a prediction module 12 common to the different modes as represented on FIG. 1.

The different modes that could be taken into account in the present invention will be detailed hereinafter.

Concerning the mode M1, starting from a vertical trajectory and a lateral trajectory being planned (received via link F1) of a given position of the airbrakes and a given motive thrust, the device 1 is able in a first time to predict the energy situation of the airplane and this, thanks to the prediction module 12. In parallel, the corresponding optimization module C1 is able to iteratively optimize the command sequence of the slats, the flaps and the landing gear so as to modulate the global energy profile, in particular re-establish the airplane on a stabilized approach.

For this mode M1, the following sequence of operations is preferably performed:

a1) an energy profile predicted thru the prediction module 12 is calculated;

a2) for this predicted energy profile, an energy error (corresponding to the difference between the predicted energy and a setpoint energy) is calculated;

a3) if the energy error is not stabilized (in the meaning that it does not converge), the following operations are performed on an iterative way:

the efficiency of the command orders on the objective to be reached is calculated;

corrections to be applied to the command orders are calculated; and the command orders are updated;

and then back to the step a1); and a4) if the energy error is stabilized (in the meaning that it converges) and minimized, said optimized command order looked at (corresponding to the command orders for which this stabilization and this minimization of the energy error are obtained) are obtained.

Moreover:

said prediction module 12 predicts the energy at said given point by making progressive calculations for a plurality of successive segments along the trajectory up to said given point, each segment corresponding to a constant aerodynamic configuration phase or to an aerodynamic configuration transient phase, parameters predicted at the end of any segment being used as initial parameters for the segment following directly; and said optimization module C1 calculates especially corrections to be applied to the command orders so as to be able to cancel the energy error.

Concerning the mode M2, starting from a vertical trajectory and a lateral trajectory being planned and starting from a given command sequence for the slats, the flaps and the landing gear, and from a given motive thrust, the device 1 is able in a first time to predict the energy situation of the airplane and this, thanks to the prediction module 12. In parallel, the corresponding optimization module C2 is able to calculate the necessary extension time and to control the extension of the airbrakes so as to reduce the energy, in particular to re-establish the airplane on a stabilized approach.

Moreover, concerning the mode M3, starting from a vertical trajectory and a lateral trajectory planned and starting from a given command sequence for the slats, the flaps and the landing gear, and from a given airbrake position, the device 1 is able in a first time to predict the energy situation of the airplane, and this, thanks to the prediction module 12. In parallel, the corresponding optimization module C3 is able to calculate the time necessary for the use of the self-throttle and to control said self-throttle so as to maintain the current speed CAS of the airplane and, thereby, to avoid a deceleration of the airplane, in particular to re-establish the airplane on a stabilized approach.

Furthermore, concerning the mode M4, starting from a lateral trajectory being planned and a given command sequence for the slats, the flaps and the landing gear and from a given airbrake position and a given motive thrust, the device 1 is able in a first time to predict the energy situation of the airplane and this, thanks to the prediction module 12. In parallel, the corresponding optimization module C4 is able to optimize the vertical trajectory or to control an optimization of the vertical trajectory (thru a third system) allowing the energy profile of the airplane to be modulated, in particular to re-establish the airplane on a stabilized approach.

For this mode M4, preferably, the following sequence of operations is performed:

A/ by calculation, the stabilization altitude is predicted, for which the airplane will reach an approach speed, as a function of determined current values, of the theoretical vertical trajectory and of predetermined models;

B/ the predicted stabilization altitude is compared to the stabilization altitude setpoint; and C/ when the difference between the predicted stabilization altitude and the setpoint stabilization altitude is in an absolute value higher than a predefined altitude threshold, a vertical trajectory optimized as a function of the current altitude of the airplane is established. Such optimized vertical trajectory is comprised between two extreme vertical trajectories, namely a minimum vertical trajectory and a maximum vertical trajectory.

As long as the difference between the predicted stabilization altitude and the setpoint stabilization altitude stays in an absolute value higher than the altitude threshold, the steps A/, B/ and C/ are iterated, the theoretical vertical trajectory being replaced, during the step A/, by the optimized trajectory established upon the precedent iteration.

Moreover, concerning the mode M5, starting from a vertical trajectory being planned and from a given command sequence of the slats, the flaps and the landing gear and from a given airbrake position and from a given motive thrust, the device 1 is able in a first time to predict the energy situation of the airplane, and this, thanks to the prediction module 12. In parallel, the corresponding optimization module C5 is able to control an optimization of the lateral trajectory to be able to modulate the energy profile of the airplane, in particular to re-establish the airplane on a stabilized approach.

Furthermore, concerning the mode M6, starting from a given command sequence for the slats, the flaps and the landing gear and from given positions of the airbrakes and the engines, the device 1 is able in a first time to determine the adequate energy variation so as to reach the given energy meeting thru the targeted operational state, and this, thanks to the prediction module 12. In parallel, the optimization module C6 is able to control a setpoint speed, a speed servo-controlled by the self-thrust, which implies that the resultant airplane fineness contributes finally to an adequate energy variation, such energy variation being calculated by the prediction module 12.

The device 1 according to the present invention thus presents numerous advantages. Amongst others, it allows:
- the coherent control of some energy control means (all or part) to be provided automatically;
- the pilot to be informed in a real time on the energy states of the airplane thru adequate operational parameters (indication of speed, altitude, etc.), whatever instantaneous and future. The future state is the one predicted at the given point of the meeting operational state;
- the pilot to be informed in a real time about the commands applied at the current time or at future moments and their effects on the trajectory and the energy balance of the airplane;
- the piloting charge of the pilot to be globally reduced; and
- an airplane meeting to satisfy at a given operational state and at a given point of the space for (in a particular case) providing a stabilized meeting of the airplane in approach.

The invention claimed is:

1. An optimized energy management method for an aircraft, upon a flight along a predetermined trajectory so as to join a given point of said trajectory in a given operational state characterized by a set of constraints, a method wherein, upon the flight of the aircraft along said trajectory until said given point, automatically and repetitively, the sequence of successive steps is implemented as follow:
   a) the current values of parameters of the aircraft are determined;
   b) the predicted energy state of the aircraft at said point is calculated with the help of at least one prediction module (12) as a function of these current values and predetermined models, and iteratively as a function of the predicted energy state, optimized command orders of means (S1, S2, S3, S4, S5, S6) for controlling the aircraft energy are determined with the help of at least one optimization module (Cn), according to a management strategy, said optimized command orders being such that they allow the aircraft to reach said given point in the given operational state; and
   c) the optimized command orders being thus determined are applied to said energy control means (S1, S2, S3, S4, S5, S6) for the aircraft,
   a method according to which a plurality of different modes is provided, each of which is associated with particular energy control means and, as a function of the management strategy used at step b), a priority order of said modes enabling the selection of the mode being used is determined through a mode management module (11).

2. The method according to claim 1, wherein the management strategy used at step b) corresponds to a selected strategy and in the absence of selection, to a default strategy.

3. The method according to claim 1, wherein at step b), at least one of the following management strategies can be used:
   a noise reduction strategy;
   a fuel consumption reduction strategy;
   a comfort management strategy for the passengers;
   a maximum efficiency strategy;
   a destination distance management strategy; and
   at least one mixed strategy combining at least two of the preceding strategies.

4. The method according to claim 1, wherein at step c), information relative to the control of the energy control means is presented to a pilot of the aircraft on a viewing screen (19).

5. The method according claim 1, wherein for a control mode for slats and flaps and for the landing gear of the aircraft, the following operations are performed at step b):
   α 1) a predicted energy profile is calculated thru the prediction module (12);
   α 2) for such predicted energy profile, an energy error is calculated;
   α 3) if the energy error is not stabilized, iteratively the following operations are performed, consisting in:
      calculating the efficiency of the command orders on the objective to be reached;
      calculating the correction to be applied to the command orders; and
      updating the command orders;
      and then back to step α 1); and
   α 4) if the energy error is stabilized and minimized, said optimized command orders looked at are obtained.

6. The method according to claim 5, wherein said prediction module (12) predicts the energy at the given point by progressive calculations for a plurality of successive segments along the trajectory until the given point, each segment corresponding to a constant aerodynamic configuration phase or to an aerodynamic configuration transient phase, parameters predicted at the end of any segment being used as initial parameters for the segment following directly, and in that said optimization module (C1) calculates correction to be applied to the command orders so as to be able to cancel the energy error.

7. The method according to claim 1, wherein at least some of the following modes are taken into account:
   a control mode for the slats and flaps;
   a control mode for the airbrakes;
   a control mode for the engines;
   a control mode for means modifying the planned vertical trajectory of the aircraft;
   a control mode for means modifying the planned lateral trajectory of the aircraft; and
   a control mode for means modifying the setpoint speed servo-controlled by the self-thrust.

8. The method according to claim 5, wherein, for each mode, a prediction module (12) and an optimization module (Cn) are provided for the command orders to be applied to the energy control means associated with said mode, and said modules (12, Cn) are implemented at step b) to determine said optimized command orders.

9. The method according to claim 1, wherein said models comprise at least some of the following elements: a wind model, performance models for the aircraf, an indication of the dynamics of actuators associated with energy control means and an indication of operational constraints.

10. The method according to claim 1, wherein in the case of a failure of the energy control means, a reconfiguration is performed on un failing energy control means.

11. An optimized energy management device for an aircraft upon a flight along a trajectory so as to join a given point of said trajectory in a given operational state characterized by a set of constraints, said device (1) comprising:

means (2) to determine the current values of parameters of the aircraft upon the flight of the aircraft along said trajectory until the given point;

means (5) comprising at least one prediction module (12) to calculate the predicted energy state at said point, as a function of these current values and predetermined models, and at least one optimization module (Cn) to determine iteratively as a function of the predicted energy state, according to a management strategy, optimized command orders of energy control means of the aircraft, said optimized command orders being such that they allow the aircraft to reach said given point in said given operational state;

means (S1, S2, S3, S4, S5, S6) for controlling the energy of the aircraft, to which the optimized command orders being so determined are applied, a plurality of different modes being provided, each of which is associated with particular energy control means; and a mode management module (11) determining for each management strategy a mode priority order enabling to select the mode to be used.

12. The device according to claim 11, wherein it comprises in addition display means (17) to present the pilot of the aircraft, on a viewing screen (19), information relative to the command of the energy control means.

13. The device according to claim 11.

wherein it comprises in addition interface means (4) enabling an operator to enter data into said device (1).

14. An aircraft, wherein it comprises a device (1) such the one specified in claim 11.

* * * * *